United States Patent Office 2,912,453
Patented Nov. 10, 1959

2,912,453

ALLYLOXY BENZONITRILES

Robert B. Moffett, Kalamazoo, Mich., assignor to The Upjohn Company, Kalamazoo, Mich., a corporation of Michigan No Drawing. Application August 29, 1958
Serial No. 757,910

5 Claims. (Cl. 260—465)

This invention relates to new organic compounds and to the process of making the same, and is more particularly directed to allyloxy-3,5-dialkylbenzonitriles and a process for their preparation.

The novel compounds of the present invention can, for the most part, be represented by the following general formula:

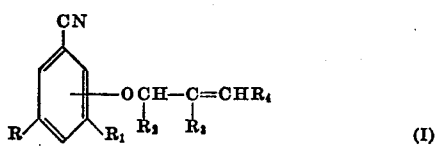

wherein R and $R_1$ represent lower-alkyl radicals, and $R_2$, $R_3$, and $R_4$ are selected from the class consisting of hydrogen and lower-alkyl radicals.

The term "lower-alkyl" as used in this specification is intended to mean an alkyl radical containing from one to six carbon atoms, such as methyl, ethyl, propyl, butyl, amyl, hexyl, and isomeric forms thereof. The term "allyloxy," except where it is employed in the naming of individual compounds, is used in the specification to include lower-alkyl-substituted allyloxy groups such as α-methallyloxy, γ-ethallyloxy, β-methallyloxy, etc.

It is an object of the invention to produce novel compounds having the Formula I above. Other objects of the invention will be apparent to those skilled in the art to which the invention pertains.

The novel compounds of the invention exhibit activity as central nervous system depressants as will be more particularly described below. In addition, the novel compounds of the invention can be reduced, for example, using lithium aluminum hydride, to the corresponding benzylamines which are useful, in accordance with U.S. Patents 1,915,334 and 2,075,359, in forming amine fluosilicate mothproofing agents and, in accordance with U.S. Patents 2,425,320 and 2,606,155, in forming amine thiocyanate-formaldehyde condensation products for use as pickling inhibitors.

The novel compounds of the invention also show activity as herbicides. Illustratively, the compound 4-allyloxy-3,5-di-n-propylbenzonitrile can be used for the effective control of undesirable grasses, particularly crabgrass.

The activity of the novel compounds of the invention as central nervous system depressants is manifested in a variety of different forms, for example, as hypnotics, as tranquillizing agents and as drug potentiators in prolonging the effect of anesthetics, analgesics, sedatives, hypnotics, and the like. Illustrative of the activity of the novel compounds of the invention in potentiating the action of drugs are the results shown in the following table, wherein the activity of representative compounds having the Formula I above in prolonging hexobarbital-induced sleeping time is compared with that of chloropromazine.

TABLE

*Effect of compounds of the invention on hexobarbital-induced sleep*

| Compound | Percent Increase of Sleeping Time at Dosages Expressed in Percent of the $LD_{50}$ | | | |
|---|---|---|---|---|
| | 20 | 10 | 5 | 2.5 |
| 4-allyloxy-3,5-di-n-propylbenzonitrile | >>700 | >1,021 | >965 | 619 |
| 4-allyloxy-3,5-diisopropylbenzonitrile | >>571 | 467 | 422 | 291 |
| 4-allyloxy-3,5-dimethylbenzonitrile | >>525 | >1,557 | 1,342 | 623 |
| 4-allyloxy-3,5-diethylbenzonitrile | >>580 | >614 | >452 | >473 |
| chloropromazine | 1,104 | 752 | 447 | 387 |

The novel compounds of the invention having the Formula I can be prepared by methods well known in the art for the preparation of benzonitriles. A particularly convenient method comprises the dehydration of the corresponding allyloxy-3,5-dialkylbenzamides using dehydrating agents such as thionyl chloride, phosphorus pentoxide, phosphorus pentachloride, phosphorus oxychloride, ammonium sulfamate, and the like. The reaction can be effected by heating together the amide and the dehydrating agent. Where the dehydrating agent is thionyl chloride, the reaction is carried out advantageously by heating the mixture of thionyl chloride and amide under conditions of reflux, although lower reaction temperatures can be employed if desired. The desired reaction product is isolated from the reaction mixture by conventional procedures, for example, by removing the excess thionyl chloride by distillation, washing the residue with alkali and with water and purifying the desired benzonitrile by distillation or recrystallization. Where the dehydrating agent is phosphorus pentoxide, the reaction is carried out advantageously by heating the reactants under reduced pressure until the desired benzonitrile distills from the reaction mixture. In order to obtain good yields of the required benzonitrile it is desirable to employ an amount of dehydrating agent which represents at least an equimolar proportion with respect to the amide used as starting material. For optimum yields it is preferable to employ the dehydrating agent in an amount in excess of that which represents equimolar proportions.

The allyloxy-3,5-dialkylbenzamides which are employed as starting materials in the above process can be prepared in a convenient manner by amidating the corresponding allyloxy-3,5-dialkylbenzoic acids in a manner in itself known in the art for making benzamides. Advantageously, the corresponding allyloxy-3,5-dialkylbenzoic acids are converted to the acid halides in a manner known in the art for making benzoyl halides, for example, by reaction with thionyl halides, phosphoryl halides or like acid halogenating agents, and the allyloxy-3,5-dialkylbenzoyl halides thus obtained are condensed with ammonia to produce the desired allyloxy-3,5-dialkylbenzamides. The allyloxy-3,5-dialkylbenzoic acids which are employed as starting materials in the above procedure can be prepared from the corresponding 3,5-dialkylhydroxybenzoic acids by methods known in the art for the preparation of allyl and substituted allyl ethers of phenols. Advantageously, the 3,5-dialkylhydroxybenzoic acids are reacted with an allyl or substituted allyl halide in the presence of a base such as an alkali metal alkoxide, anhydrous potassium carbonate, and the like. The ether ester so produced is then subjected to hydrolysis, for example, using aqueous alkali metal hydroxide, to yield the desired allyloxy-3,5-dialkylbenzoic acid. The proportions of allyl or substituted allyl halide and 3,5-dialkylhydroxybenzoic acid employed in the above reaction can vary over a wide range but it is preferable that the allyl halide be employed in an amount in excess of the stoichiometric quantity. The 3,5-dialkylhydroxybenzoic acids employed in the preparation of the allyl ethers can themselves be prepared by methods well known in the art. For example, the corresponding 2,6-dialkylphenols and 2,4-dialkylphenols can be subjected to the Kolbe reaction in which the phenol in the form of its sodium derivative is treated with carbon dioxide. The 2,6-dialkylphenols yield the corresponding 3,5-dialkyl-4-hydroxybenzoic acids and the 2,4-dialkylphenols yield the corresponding 3,5-dialkyl-2-hydroxybenzoic acids. The 3,5-di-n-propyl-4-hydroxybenzoic acid can also be prepared in the form of its ester by catalytic hydrogenation of an ester of 3,5-diallyl-4-hydroxybenzoic acid, such as the ethyl ester, which can be prepared by the procedure of Claisen and Eisleb, Liebig's Annalen de Chemie, 401, 21 (1913). The ester so obtained can be converted to the corresponding allyl ether and then subjected to hydrolysis to yield the desired 4-allyloxy-3,5-di-n-propylbenzoic acid. Alternatively, the ester can be hydrolyzed directly to 3,5-di-n-propyl-4-hydroxybenzoic acid and the latter then converted to the allyl ether. Similarly, 3,5-di-n-propyl-2-hydroxybenzoic acid can be obtained from the esters of 3,5-diallyl-2-hydroxybenzoic acid [Claisen and Eisleb, ibid., page 77].

The following examples are illustrative of the process and products of the present invention, but are not to be construed as limiting.

PREPARATION 1

*4-allyloxy-3,5-di-n-propylbenzoyl chloride*

A solution of 200 grams (0.706 mole) of 3,5-di-n-propyl-4-allyloxybenzoic acid (copending application Serial No. 603,236, filed August 10, 1956, now U.S. Patent 2,855,419) and 100 milliliters of thionyl chloride in 200 milliliters of benzene was heated under reflux for two hours. The solvent and excess thionyl chloride were distilled under reduced pressure and then the residue was distilled from a Claisen flask, giving 186.4 grams of 4-allyloxy-3,5-di-n-propylbenzoyl chloride (94 percent) as a yellow liquid having a boiling point of 127 degrees centigrade at a pressure of 0.1 millimeter of mercury; $n_D^{25}$ 1.4281.

*Analysis.*—Calcd. for $C_{16}H_{21}ClO_2$: Cl, 12.62. Found: Cl, 12.70.

PREPARATION 2

*4-allyloxy-3,5-diisopropylbenzoic acid*

In a three-liter flask was placed 187 grams (0.84 mole) of 4-hydroxy-3,5-diisopropylbenzoic acid [J. Am. Chem. Soc. 79, 5019 (1957)] in 400 milliliters of methanol. The flask was fitted with a stirrer, reflux condenser and two dropping funnels. In one funnel was placed a solution of sodium methoxide prepared from eighty grams (3.5 moles) of sodium and 1.2 liters of methanol; in the other funnel was placed 346 milliliters (four moles) of allyl bromide. One-half of the sodium methoxide solution and of the allyl bromide were added with stirring and the mixture was heated (about three hours) under reflux until neutral. Then one-half of the remaining sodium methoxide solution and of the remaining allyl bromide were added and the mixture again heated (about one hour) under reflux until neutral. The remainder of the sodium methoxide solution and the allyl bromide were added and the refluxing was continued for five hours until the mixture was again neutral. About one liter of solvent was distilled to remove excess allyl bromide and 130 milliliters of fifty percent aqueous sodium hydroxide and 300 milliliters of water were added. After heating under reflux for two hours most of the remaining solvent was removed under reduced pressure on a steam bath and water was added. The mixture was extracted twice with ether and the ether solutions were combined and extracted twice with water. The aqueous extracts were combined and acidified. The suspension so obtained was warmed while bubbling in nitrogen to remove ether and the solid was collected by filtration, washed with water, dried, and recrystallized from 700 milliliters of ethanol. There was thus obtained 149 grams of 4-allyloxy-3,5-diisopropylbenzoic acid in the form of a crystalline solid having a melting point of 185.5 to 187.5 degrees centigrade.

*Analysis.*—Calcd. for $C_{16}H_{22}O_3$: C, 73.25; H, 8.46. Found: C, 73.13; H, 8.60.

PREPARATION 3

*4-allyloxy-3,5-dimethylbenzoic acid*

To a suspension of 223 grams (1.34 moles) of 3,5-dimethyl-4-hydroxybenzoic acid [Monatsh. 81, 1071 (1950)] in 500 milliliters of methanol was added, with stirring, one-half of a solution of sodium methoxide prepared from 115 grams of sodium and 1.7 liters of methanol and one-half of 475 milliliters (5.5 moles) of allyl bromide. The mixture was heated (about one hour) under reflux with stirring until it was neutral and then one-half of the remainder of the sodium methoxide solution and of the allyl bromide were added. The mixture was again heated under reflux until neutral when the remainder of the sodium methoxide solution and the allyl bromide were added. The mixture was heated under reflux until neutral and about 500 milliliters of the solvent was then distilled. To the residue was added 250 milliliters of fifty percent aqueous sodium hydroxide and 300 milliliters of water and the mixture was heated under reflux for three hours. Most of the methanol was then distilled from a steam bath and water was added to the residue. The mixture was cooled and extracted twice with ether. The aqueous solution was acidified with hydrochloric acid and the solid which separated was collected, washed with water, dried, and recrystallized from ethanol. There was thus obtained 171.7 grams (second crop; 45.8 grams) of 4-allyloxy-3,5-dimethylbenzoic acid in the form of a crystalline solid having a melting point of 146 to 146.5 degrees centigrade.

*Analysis.*—Calcd. for $C_{12}H_{14}O_3$: C, 69.88; H, 6.84. Found: C, 69.59; H, 6.72.

PREPARATION 4

*3,5-di-n-propyl-4-β-methallyloxybenzoic acid*

A. ETHYL 3,5-DI-N-PROPYL-4-β-METHALLYLOXYBENZOATE

To a sodium methoxide solution prepared from 13.8 grams (0.6 mole) of sodium and 200 milliliters of methanol was added a solution of 150.2 grams (0.6 mole) of ethyl 3,5-di-n-propyl-4-hydroxybenzoate (prepared as described in copending application Serial No. 603,236, filed August 10, 1956) in 300 milliliters of methanol. To the solution was added slowly eighty grams (1.0 mole) of β-methallyl chloride after which the mixture was stirred for one hour at room temperature and one hour under reflux. Most of the solvent was distilled and the residue was diluted with water and extracted three times with benzene. The benzene solution was washed with 100 milliliters of ice-cold ten percent aqueous sodium hydroxide solution, then twice with water, and finally with saturated sodium chloride solution. Part of the benzene was distilled to dry the solution which was then shaken with 100 grams of Fisher alumina and filtered through another 100 grams of alumina. The solvent was removed and the residue was distilled through a six-inch column (one-eighth inch helices), giving 94.13 grams of a liquid having a boiling point of 112 to 120 degrees centigrade at a pressure of 0.02 millimeter of mercury; $n_D^{25}$ 1.5090 to 1.5098. The distillate was mixed with Claisen solution (350 grams of potassium hydroxide dissolved in 250 milliliters of water and diluted with an equal volume of methanol). The mixture was extracted three times with Skellysolve B (mixture of hexanes) and the Skellysolve B solution was washed with saturated sodium chloride solution and dried over anhydrous sodium sulfate. The solvent was removed and the residue was distilled through a six-inch column (one-eighth inch helices). There was thus obtained ethyl 3,5-di-n-propyl-4-β-methallyloxybenzoate in the form of an oil having a boiling point of 118 to 125 degrees centigrade at a pressure of 0.025 millimeter of mercury; $n_D25$ 1.5061.

*Analysis.*—Calcd. for $C_{19}H_{28}O_3$: C, 74.96; H, 9.27. Found: C, 74.96; H, 8.81.

B. 3,5-DI-N-PROPYL-4-β-METHALLYLOXYBENZOIC ACID

A mixture of 30.4 grams (0.1 mole) of ethyl 3,5-di-n-propyl-4-β-methallyloxybenzoate, 35 grams of 85 percent potassium hydroxide in seventy milliliters of water and 125 milliliters of ethanol was heated under reflux with stirring for eight hours. Most of the ethanol was distilled, water was added, the mixture was extracted twice with ether and acidified. The acid solution was extracted three times with ether which was washed with water and dried over anhydrous sodium sulfate. The ether was distilled and the residue crystallized on standing. There was thus obtained 20.7 grams of 3,5-di-n-propyl-4-β-methallyloxybenzoic acid in the form of a crystalline solid having a melting point of 80 to 83 degrees centigrade.

*Analysis.*—Calcd. for $C_{17}H_{24}O_3$: C, 73.88; H, 8.75. Found: C, 74.17; H, 9.29.

PREPARATION 5

*4-allyloxy-3,5-diethylbenzoyl chloride*

A. 3,5-DIETHYL-4-HLDROXYBENZOIC ACID

To a sodium methoxide solution prepared from 69 grams (3.0 moles) of sodium and one liter of methanol was added a solution of 450 grams (3.0 moles) of 2,6-diethylphenol (Ber. 57, 1275) in 250 milliliters of toluene. The methanol was then distilled through a Vigreaux column and toluene was added to keep the volume at about 1.5 to 1.7 liters. When the boiling point reached 107 degrees centigrade the contents of the flask were cooled under an atmosphere of nitrogen, transferred to an autoclave and heated at 200 degrees centigrade for ten hours under a carbon dioxide pressure of 450 pounds per square inch. The reaction product was washed from the autoclave with water and the toluene layer was separated and extracted with 600 milliliters of five percent aqueous sodium bicarbonate solution. The aqueous solutions were combined, washed with ether and acidified with hydrochloric acid. The solid which separated was collected, washed with water, dried and recrystallized from aqueous ethanol. There was thus obtained 193 grams of 3,5-diethyl-4-hydroxybenzoic acid having a melting point of 151 to 158 degrees centigrade.

*Analysis.*—Calcd. for $C_{11}H_{14}O_3$: C, 68.02; H, 7.27. Found: C, 68.31; H, 7.13.

B. 4-ALLYLOXY-3,5-DIETHYLBENZOIC ACID

To a solution of 171.1 grams (0.914 mole) of 3,5-diethyl-4-hydroxybenzoic acid in 150 milliliters of methanol was added with stirring, one-half of a solution of sodium methoxide prepared from 53 grams of sodium and 800 milliliters of methanol followed by one-half of 332 grams (2.7 moles) of allyl bromide. The mixture was heated under reflux with stirring until it was neutral. One-half of the remaining sodium methoxide solution and allyl bromide were added and the refluxing was continued until the mixture was again neutral. The remainder of the sodium methoxide solution and the allyl bromide were then added and the refluxing continued until the mixture was neutral. Part of the solvent and the excess of allyl bromide were distilled under reduced pressure and 150 milliliters of fifty percent aqueous sodium hydroxide, 250 milliliters of water and 100 milliliters of methanol were then added. The mixture was heated under reflux for two hours and part of the solvent was distilled. Water was added and the mixture was extracted twice with ether. The ether solutions were back extracted with water and the aqueous solutions were combined and acidified with hydrochloric acid. The oil which separated, rapidly crystallized and was collected, washed with water, dried, and recrystallized, giving 158.9 grams of crystals having a melting point of 88 to 91 degrees centigrade. A portion of this material was recrystallized from ethanol. There was thus obtained 4-allyloxy-3,5-diethylbenzoic acid having a melting point of 91 to 92.5 degrees centigrade.

*Analysis.*—Calcd. for $C_{14}H_{18}O_3$; C, 71.77; H, 7.74. Found: C, 72.16; H, 7.91.

C. 4-ALLYLOXY-3,5-DIETHYLBENZOYL CHLORIDE

A solution of 133.5 grams (0.57 mole) of 4-allyloxy-3,5-diethylbenzoic acid in 100 milliliters of thionyl chloride and 100 milliliters of benzene was heated under reflux with stirring for three and one-half hours. After distilling the excess thionyl chloride and benzene the crude acid chloride was diluted with benzene to a volume of 500 milliliters. This solution of 4-allyloxy-3,5-diethylbenzoyl chloride in benzene was used as such in the procedure described in Example 3A below.

PREPARATION 6

*2-alloyloxy-3,5-di-n-propylbenzoic acid*

A. METHYL 3,5-DI-N-PROPYL-2-HYDROXYBENZOATE

A solution of 58 grams (0.25 mole) of methyl 3,5-diallyl-2-hydroxybenzoate [Claisen and Eisleb, Ann. 401, 77 (1913)] in 100 milliliters of methanol was hydrogenated in the presence of 0.2 gram of platinum oxide at room temperature and a pressure of fifty pounds per square inch. The theoretical amount of hydrogen was absorbed in about one-half hour. Two other similar runs were made (representing a total of 0.894 mole of the starting methyl 3,5-diallyl-2-hydroxybenzoate) and the reaction products from the three runs were combined and filtered. The solvent was removed from the filtrate and the residue was distilled through a six-inch column (one-eighth inch helices). There was thus obtained 207.8 grams of methyl 3,5-di-n-propyl-2-hydroxybenzoate in the form of an oil having a boiling point of 127 degrees centigrade at a pressure of 1.5 millimeters of mercury; $n_D^{25}$ 1.5139.

*Analysis.*—Calcd. for $C_{14}H_{20}O_3$; C, 71.16; H, 8.53. Found: C, 71.34; H, 8.78.

B. METHYL 2-ALLYLOXY-3,5-DI-N-PROPYLBENZOATE

To a solution of 170 grams (0.71 mole) of methyl 3,5-di-n-propyl-2-hydroxybenzoate in 200 milliliters of methanol were added, portionwise and alternately, 121 grams (1.0 mole) of allyl bromide and a solution of 18.4 grams (0.8 mole) of sodium in 300 milliliters of methanol. When the addition was complete, the mixture was heated under reflux until neutral. The solvent was distilled and the residue was diluted with ether. The ether solution was washed twice with water, then with ice-cold twenty percent aqueous sodium hydroxide solution, then twice with water and finally with saturated sodium chloride solution. After drying over anhydrous sodium sulfate, filtering and removing the solvent, the product was dissolved in 700 milliliters of Skellysolve B and shaken with 150 grams of Fisher alumina. The solution was filtered through an additional 150 grams of alumina and the solvent was removed. The residue was distilled through a twelve-inch column (one-eighth inch helices) and the fraction having a boiling point of 115 to 120 degrees centigrade at a pressure of 0.35 millimeter of mercury was collected. There was thus obtained methyl 2-allyloxy-3,5-di-n-propylbenzoate in the form of an oil; $n_D^{25}$ 1.5051.

*Analysis.*—Calcd. for $C_{17}H_{24}O_3$: C, 73.88; H, 8.75. Found: C, 74.35; H, 8.93.

C. 2-ALLYLOXY-3,5-DI-N-PROPYLBENZOIC ACID

A solution of 114.1 grams (0.413 mole) of methyl 2-allyloxy-3,5-di-n-propylbenzoate, 500 milliliters of twenty percent aqueous sodium hydroxide solution and 400 milliliters of methanol was heated under reflux for six hours. Part of the solvent was distilled under reduced pressure and 1.5 liters of water was added. Ether was added until two layers were formed and the ether layer was extracted with two portions of 500 milliliters of water. The combined aqueous extracts were acidified and the oil which separated crystallized on bubbling in nitrogen to remove the remaining ether. The solid was collected, washed with water, dried, and recrystallized from pentane. There was thus obtained 80.2 grams of 2-allyloxy-3,5-di-n-propylbenzoic acid in the form of a crystalline solid having a melting point of 47 to 49 degrees centigrade.

*Analysis.*—Calcd. for $C_{16}H_{22}O_3$: C, 73.25; H, 8.46. Found: C, 73.07; H, 8.75.

EXAMPLE 1

4-allyloxy-3,5-diisopropylbenzonitrile

A. 4-ALLYLOXY-3,5-DIISOPROPYLBENZAMIDE

A solution of 96 grams (0.364 mole) of 4-allyloxy-3,5-diisopropylbenzoic acid, 75 milliliters of benzene and 54.4 milliliters (0.75 mole) of thionyl chloride was heated under reflux for two hours. The solvent and excess thionyl chloride were distilled under reduced pressure and the residue was diluted to 300 milliliters with absolute ether. Ammonia gas was passed into the solution with stirring until saturated and the mixture was shaken with water and with ether. The insoluble solid was collected by filtration and the ether layer was separated, washed with water, concentrated and cooled. The solid which separated from the cooled solution was isolated by filtration and combined with the solid previously isolated. The combined material was recrystallized from ethanol. There was thus obtained 4-allyloxy-3,5-diisopropylbenzamide in the form of a crystalline solid having a melting point of 169 to 171 degrees centigrade.

*Analysis.*—Calcd. for $C_{16}H_{23}NO_2$: C, 75.53; H, 8.87; N, 5.36. Found: C, 73.31; H, 8.79; N, 5.24.

B. 4-ALLYLOXY-3,5-DIISOPROPYLBENZONITRILE

In a 500-milliliter Claisen flask were well mixed by shaking 26.1 grams (0.1 mole) of 4-allyloxy-3,5-diisopropylbenzamide and twenty grams (0.14 mole) of phosphorus pentoxide. The flask was heated in an oil bath to 165 degrees centigrade and a high vacuum was applied to the receiver. The product distilled rapidly at a temperature of 130 degrees centigrade and a pressure of 0.4 millimeter of mercury in the form of a colorless liquid which solidified to give 13.7 grams of a white solid having a melting point of 72 to 79 degrees centigrade. This solid was recrystallized from pentane. There was thus obtained 12.26 grams of 4-allyloxy-3,5-diisopropylbenzonitrile in the form of a crystalline solid having a melting point of 75 to 80 degrees centigrade.

*Analysis.*—Calcd. for $C_{16}H_{21}NO$: C, 78.97; H, 8.70; N, 5.76. Found: C, 78.66; H, 8.73; N, 5.80.

EXAMPLE 2

4-allyloxy-3,5-dimethylbenzonitrile

A. 4-ALLYLOXY-3,5-DIMETHYLBENZAMIDE

A solution of 125 grams (0.607 mole) of 4-allyloxy-3,5-dimethylbenzoic acid, 75 milliliters of benzene and 90.8 milliliters (1.25 moles) of thionyl chloride was heated under reflux for two hours. The solvent and excess thionyl chloride were distilled under reduced pressure and the residue (4-allyloxy-3,5-dimethylbenzoyl chloride) was diluted to 335 milliliters with absolute ether. Ammonia gas was passed into the solution with rapid stirring until saturated. A white solid separated and the mixture was allowed to stand overnight at room temperature before being diluted with water and a small quantity of aqueous sodium hydroxide solution. The solid which had separated was collected, washed with water and with ether and dried (109 grams). The ether washings were separated and concentrated to yield a further 8.43 grams of the desired amide. The combined material was recrystallized from ethanol. There was thus obtained 4-allyloxy-3,5-dimethylbenzamide in the form of a crystalline solid, having a melting point of 144 to 146 degrees centigrade.

*Analysis.*—Calcd. for $C_{12}H_{15}NO_2$: C, 70.22; H, 7.37; N, 6.82. Found: C, 70.29; H, 7.55; N, 7.09.

B. 4-ALLYLOXY-3,5-DIMETHYLBENZONITRILE

A solution of 51.4 grams (0.25 mole) of 4-allyloxy-3,5-dimethylbenzamide in 130 milliliters of thionyl chloride was heated under reflux for six and one-half hours, and allowed to stand overnight. The excess thionyl chloride was distilled under reduced pressure and the residue was dissolved in ether. This solution was washed successively with water, dilute sodium hydroxide solution, water, and saturated sodium chloride solution and dried over anhydrous sodium sulfate. After filtration and removal of the solvent, the product was distilled through a six-inch (one-eighth inch helices) column, giving twenty grams of a liquid having a boiling point of 93 degrees centigrade at a pressure of 0.06 millimeter of mercury which solidified. The solid had a melting point of 54 to 57 degrees centigrade. This product was recrystallized from pentane. There was thus obtained 4-allyloxy-3,5-dimethylbenzonitrile in the form of a crystalline solid having a melting point of 53.5 to 56.5 degrees centigrade.

*Analysis.*—Calcd. for $C_{12}H_{13}NO$: C, 76.97; H, 7.00; N, 7.48. Found: C, 76.53; H, 7.16; N, 7.55.

EXAMPLE 3

4-allyloxy-3,5-diethylbenzonitrile

A. 4-ALLYLOXY-3,5-DIETHYLBENZAMIDE

Ammonia gas was passed with stirring into 200 milliliters of the solution of 4-allyloxy-3,5-diethylbenzoyl chloride in benzene, prepared as described in Preparation 5C, until the solution was saturated. After stirring for a further one hour and standing overnight at room temperature, the mixture was diluted with ether, washed successively with dilute hydrochloric acid, water, dilute aqueous sodium hydroxide, twice again with water and with saturated sodium chloride solution. After drying over anhydrous sodium sulfate, the ether solution was distilled and the residue was recrystallized from ether. There was thus obtained 42.7 grams of 4-allyloxy-3,5-diethylbenzamide having a melting point of 166 to 167 degrees centigrade.

*Analysis.*—Calcd. for $C_{14}H_{19}NO_2$: C, 72.07; H, 8.21; N, 6.01. Found: C, 72.19; H, 8.40; N, 6.05.

B. 4-ALLYLOXY-3,5-DIETHYLBENZONITRILE

A mixture of 27.9 grams (0.12 mole) of 4-allyloxy-3,5-diethylbenzamide and eighty milliliters of thionyl chloride was heated under reflux with stirring for two hours. The excess thionyl chloride was distilled and the residue was dissolved in ether. This was washed with dilute aqueous sodium hydroxide solution, twice with water and finally with saturated sodium chloride solution. After drying over anhydrous sodium sulfate, filtering and removing the solvent, the product was distilled. The fraction having a boiling point of 103 degrees centigrade at a pressure of 0.1 millimeter of mercury was collected. There was thus obtained twelve grams of 4-allyloxy-3,5-diethylbenzonitrile in the form of a liquid; $n_D^{25}$ 1.5248.

*Analysis.*—Calcd. for $C_{14}H_{17}NO$: C, 78.10; H, 7.96; N, 6.56. Found: C, 78.17; H, 8.23; N, 6.32.

EXAMPLE 4

*4-allyloxy-3,5-di-n-propylbenzonitrile*

A. 4-ALLYLOXY-3,5-DI-N-PROYLBENZAMIDE

A mixture of 28.1 grams (0.1 mole) of 3,5-di-n-propyl-4-allyloxybenzoyl chloride and 300 milliliters of aqueous ammonium hydroxide was shaken and cooled until the reaction subsided, and was then shaken at room temperature for 1.5 hours. After standing for several days, the crystalline product was collected, washed with water, and dried, giving 22.1 grams of white crystals having a melting point of 104 to 107 degrees centigrade. The product was recrystallized from technical n-hexane. There was thus obtained 21.3 grams of 4-allyloxy-3,5-di-n-propylbenzamide in the form of white crystals having a melting point of 108.5 to 109.5 degrees centigrade.

*Analysis.*—Calcd. for $C_{16}H_{23}NO_2$: C, 73.53; H, 8.87; N, 5.36. Found: C, 73.58; H, 8.53; N, 5.29.

B. 4-ALLYLOXY-3,5-DI-N-PROPYLBENZONITRILE

A solution of 44.8 grams (0.171 mole) of 4-allyloxy-3,5-di-n-propylbenzamide in 100 milliliters of thionyl chloride was heated on a steam bath with stirring under reflux until no more sulfur dioxide and hydrogen chloride were evolved. The excess thionyl chloride was distilled under reduced pressure. The residue was dissolved in ether and washed with dilute aqueous sodium hydroxide, water and saturated sodium chloride solution and dried over anhydrous sodium sulfate. After filtration the solvent was removed and the product was distilled under reduced pressure. There was thus obtained 4-allyloxy-3,5-di-n-propylbenzonitrile in the form of an oil having a boiling point of 118 degrees centigrade at a pressure of 0.005 millimeter of mercury; $n_D^{25}$ 1.5145.

*Analysis.*—Calcd. for $C_{16}H_{21}NO$: C, 78.97; H, 8.70; N, 5.76. Found: C, 78.66; H, 8.39; N, 5.96.

EXAMPLE 5

*3,5-di-n-propyl-4-β-methallyloxybenzonitrile*

A. 3,5-DI-N-PROPYL-4-β-METHALLYLOXYBENZAMIDE

A mixture of 12.5 grams of 3,5-di-n-propyl-4-β-methallyloxybenzoic acid, fifteen milliliters of thionyl chloride and fifteen milliliters of benzene was heated under reflux for two hours. The solvent was distilled under reduced pressure and 170 milliliters of 29 percent aqueous ammonium hydroxide solution was added cautiously with cooling. After shaking the mixture for two hours, the solid which had separated was collected, washed with water, dried and recrystallized from methylcyclohexane. There was thus obtained 9.04 grams of 3,5-di-n-propyl-4-β-methallyloxybenzamide in the form of a crystalline solid having a melting point of 134.5 to 136 degrees centigrade.

*Analysis.*—Calcd. for $C_{17}H_{25}NO_2$: C, 74,14; H, 9.15; N, 5.09. Found: C, 73.98; H, 8.93; N, 5.09.

B. 3,5-DI-N-PROPYL-4-β-METHALLYLOXYBENZONITRILE

Using the procedure described in Example 1B, but substituting 3,5-di-n-propyl-4-β-methallyloxybenzamide for 4-allyloxy-3,5-diisopropylbenzamide, 3,5-di-n-propyl-4-β-methylallyloxybenzonitrile can be obtained.

EXAMPLE 6

*2-allyloxy-3,5-di-n-propylbenzonitrile*

A. 2-ALLYLOXY-3,5-DI-N-PROPYLBENZAMIDE

A solution of 87.5 grams (0.334 mole) of 2-allyloxy-3,5-di-n-propylbenzoic acid in fifty milliliters of benzene and 72.6 milliliters (1 mole) of thionyl chloride was heated under reflux for one and three-quarter hours. The excess thionyl chloride and benzene were distilled under reduced pressure. The residue was dissolved in absolute ether and ammonia gas was passed in with stirring and cooling in an ice-bath until saturated. After standing for one-half hour at room temperature, the mixture was washed twice with water, twice with dilute hydrochloric acid, twice with water and finally with saturated sodium chloride solution. The solution was dried over anhydrous sodium sulfate and the solvent was distilled. The residue was recrystallized from Skelly solve B. There was thus obtained 65.4 grams of 2-allyloxy-3,5-di-n-propylbenzamide in the form of a crystalline solid having a melting point of 86 to 88 degrees centigrade.

*Analysis.*—Calcd. for $C_{16}H_{23}NO_2$: C, 73.53; H, 8.87; N, 5.36. Found: C, 73.63; H, 9.09; N, 5.14.

B. 2-ALLYLOXY-3,5-DI-N-PROPYLBENZONITRILE

Using the procedure described in Example 1B, bu substituting 2-allyloxy-3,5-di-n-propylbenzamide for 4-allyloxy-3,5-diisopropylbenzamide, 2-allyloxy-3,5-di-n propylbenzonitrile can be obtained.

It is to be understood that the invention is not t be limited to the exact details of operation or exact com pounds shown and described, as obvious modification and equivalents will be apparent to one skilled in th art, and the invention is therefore to be limited only b the scope of the appended claims.

I claim:
1. A compound having the formula

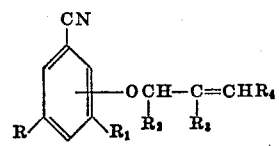

wherein R and $R_1$ represent lower-alkyl radicals, and R $R_3$ and $R_4$ are selected from the class consisting of hy drogen and lower-alkyl radicals.

2. 4-allyloxy-3,5-diisopropylbenzonitrile.
3. 4-allyloxy-3,5-dimethylbenzonitrile.
4. 4-allyloxy-3,5-diethylbenzonitrile.
5. 4-allyloxy-3,5-di-n-propylbenzonitrile.

References Cited in the file of this patent

Degering: "An Outline of Organic Nitrogen Con pounds," 1945, p. 536, Section 1704.